US008865344B2

(12) United States Patent
Kim et al.

(10) Patent No.: US 8,865,344 B2
(45) Date of Patent: Oct. 21, 2014

(54) RECHARGEABLE BATTERY (75) Inventors: Yong-Sam Kim, Yongin-si (KR);
Jang-Hyun Song, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 143 days.

(21) Appl. No.: 13/304,817

(22) Filed: Nov. 28, 2011

(65) Prior Publication Data
US 2013/0004832 A1    Jan. 3, 2013

(30) Foreign Application Priority Data
Jun. 30, 2011 (KR) .................. 10-2011-0065018

(51) Int. Cl.
H01M 2/02 (2006.01)
H01M 2/08 (2006.01)

(52) U.S. Cl.
USPC ............ 429/181; 429/180; 429/171; 429/174

(58) Field of Classification Search
USPC .......... 429/463, 179, 180, 181, 121, 171, 174
See application file for complete search history.

(56) References Cited

U.S. PATENT DOCUMENTS

2003/0077511 A1*  4/2003  Mizuno et al. ................ 429/181
2010/0233528 A1   9/2010  Kim et al.
2011/0135976 A1   6/2011  Byun
2012/0064394 A1*  3/2012  Kim et al. .................... 429/181

FOREIGN PATENT DOCUMENTS

| KR | 10-2003-0032561 A | 4/2003 |
| KR | 10-2007-0014622 A | 2/2007 |
| KR | 10-2010-0102462 A | 9/2010 |
| KR | 10-2011-0065277 A | 6/2011 |
| WO | WO 9905896 A1 * | 2/1999 |

OTHER PUBLICATIONS

Korean Office action dated Oct. 30, 2012 for KR 10-2011-0065018; Kim, et al.

* cited by examiner

Primary Examiner — Jonathan Jelsma
(74) Attorney, Agent, or Firm — Lee & Morse, P.C.

(57) ABSTRACT

A rechargeable battery includes an electrode assembly having a separator between electrode plates, a case accommodating the electrode assembly, a cap plate coupled to an opening of the case, an electrode terminal through a terminal hole in the cap plate, a gasket between the electrode terminal and an interior circumference of the terminal hole, an insulator between the cap plate and the electrode terminal, a portion of the gasket being between the insulator and the electrode terminal, and a sealing member between the gasket and the insulator, the sealing member extending continuously along a first surface of the gasket and along a first surface of the insulator, the first surface of the gasket and the first surface of the insulator being non-parallel to each other.

20 Claims, 7 Drawing Sheets

RECHARGEABLE BATTERY

BACKGROUND

1. Field

The described technology relates generally to a rechargeable battery of which an electrode terminal is assembled to a terminal hole in a cap plate.

2. Description of the Related Art

A rechargeable battery is a battery that is repetitively charged and discharged unlike a primary battery. Low-capacity rechargeable batteries may be used for portable compact electronic apparatuses, e.g., mobile phones, notebook computers, and camcorders, and high-capacity rechargeable batteries may be used as a power supply for driving a motor, e.g., of a hybrid vehicle, etc.

For example, the rechargeable battery includes an electrode assembly having electrode palates at both sides of a separator, a case installing the electrode assembly, a cap plate coupled to an opening of the case, and an electrode terminal provided in the cap plate and connected to an electrode as a lead tab. The electrode terminal may include a rivet terminal disposed at an inner side of the cap plate and the terminal hole, thereby electrically connecting a lead tab and a plate terminal provided at the outside of the cap plate and connected to the rivet terminal.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery that blocks an ion exchange path in a portion where a cap plate and an electrode terminal are assembled.

Embodiments of a rechargeable may include an electrode assembly having a separator between electrode plates, a case accommodating the electrode assembly, a cap plate coupled to an opening of the case, an electrode terminal through a terminal hole in the cap plate, a gasket between the electrode terminal and an interior circumference of the terminal hole, an insulator between the cap plate and the electrode terminal, a portion of the gasket being between the insulator and the electrode terminal, and a sealing member between the gasket and the insulator, the sealing member extending continuously along a first surface of the gasket and along a first surface of the insulator, the first surface of the gasket and the first surface of the insulator being non-parallel to each other.

The electrode terminal may include a rivet terminal through the terminal hole, the gasket being between the interior circumference of the terminal hole and an external circumference of the rivet terminal, and a plate terminal exterior to the cap plate and connected to the rivet terminal, the insulator being between an exterior of the cap plate and the plate terminal, and an interior circumference of a through-hole of the insulator and an exterior circumference of the gasket facing each other.

The sealing member may include a cylinder between the interior circumference of the through-hole of the insulator and the exterior circumference of the gasket, a first flange bent from an upper end of the cylinder toward a center of the cylinder, the first flange being between the gasket and the plate terminal, and a second flange bent from a lower end of the cylinder in an opposite direction with respect to the first flange, the second flange being between the insulator and the cap plate.

The first flange and the second flange may be flat.

The first flange may include a first protrusion protruding toward the plate terminal at an upper end of the cylinder.

The second flange may include a second protrusion protruding toward the insulator from the cap plate.

The first flange may include a pair of first protrusions protruding toward the plate terminal and an upper end of the gasket.

The second flange may include a pair of second protrusions protruding toward the insulator and the cap plate.

The first flange may include a first protrusion and depression portion that is concave and convex toward the plate terminal and an upper end of the gasket.

The second flange may include a second protrusion and depression portion that is concave and convex toward the insulator and the cap plate.

The sealing member may extend along and contacts at least two different surfaces of each of the gasket and the insulator.

The sealing member may directly contact the gasket, the insulator, the plate terminal, the rivet terminal, and the cap plate.

The sealing member and the insulator may directly contact each other, the sealing member and the insulator separating the cap plate from the electrode terminal in a first direction.

The sealing member and the gasket may directly contact each other, portions of the sealing member and the gasket separating the cap plate from the electrode terminal in the first direction.

At least two of the sealing member, the gasket, and the insulator may be arranged to contact each to define a double-sealing structure, the double-sealing structure including two insulating elements separating the cap plate from the electrode terminal.

Embodiments of a rechargeable battery may also include an electrode assembly having a separator between electrode plates, a case accommodating the electrode assembly, a cap plate coupled to an opening of the case, and an electrode terminal through a terminal hole in the cap plate, the electrode terminal including a rivet terminal and a plate terminal connected to the rivet terminal and disposed outside the cap plate, the electrode terminal having a double-sealing structure along the rivet terminal between the plate terminal and the cap plate and a triple-sealing structure in a diameter direction of the rivet terminal.

The rechargeable battery may further include a gasket between the rivet terminal and the terminal hole, an insulator disposed between the cap plate and the plate terminal, and a sealing member contacting the gasket and the insulator to define the double-sealing structure and the triple-sealing structure.

The double-sealing structure may include at least portions of the sealing member and the gasket between the cap plate and the plate terminal, and at least portions of the sealing member and the insulator between the cap plate and the plate terminal, and the triple-sealing structure may include the sealing member, the insulator, and the gasket between the cap plate and the plate terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0065018, filed on Jun. 30, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element, e.g., a layer, is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
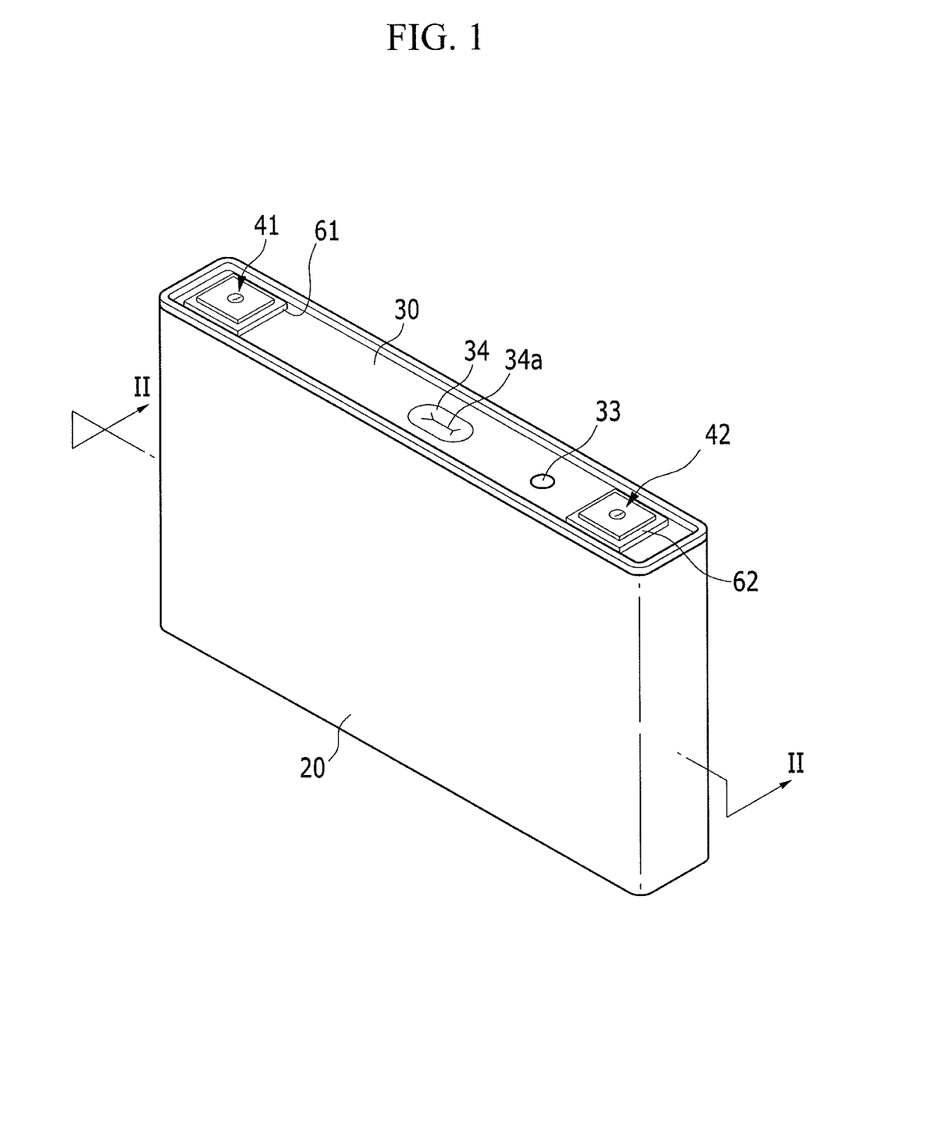
FIG. 1 illustrates a perspective view of a rechargeable battery according to a first exemplary embodiment.
Figure 2:
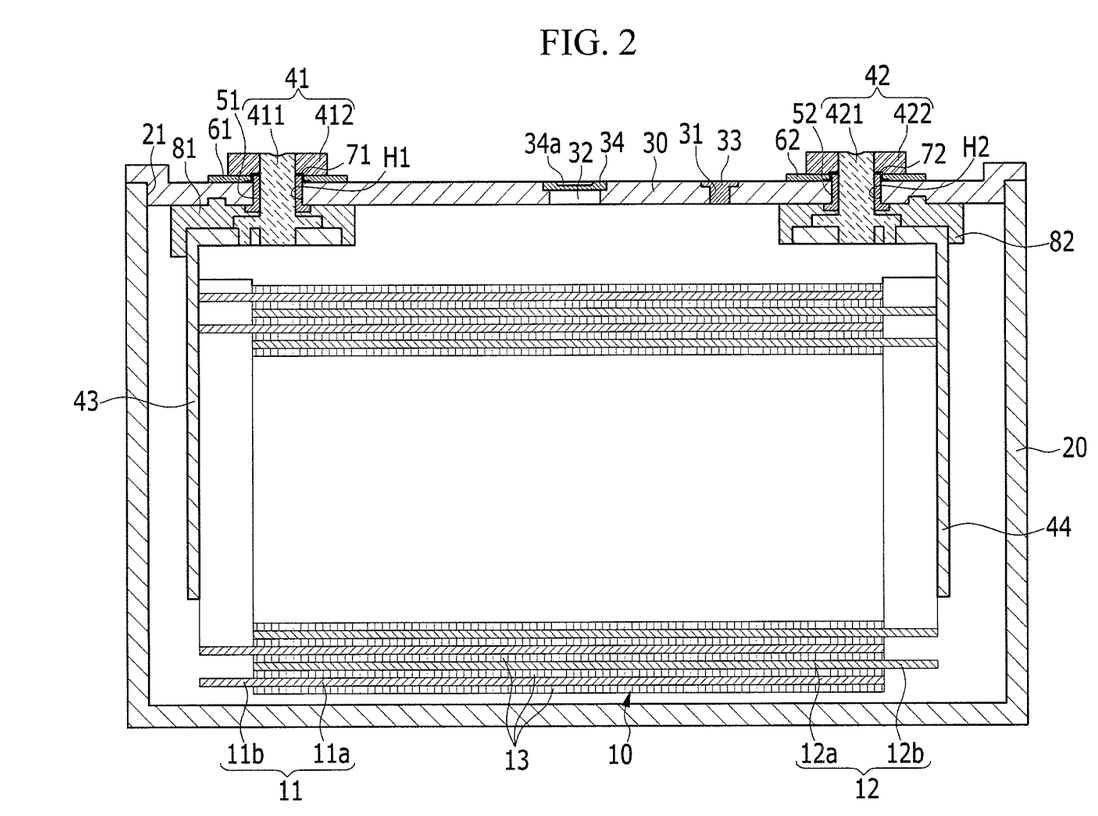
FIG. 2 illustrates a cross-sectional view of FIG. 1 along line II-II.

FIG. 1 is a perspective view of a rechargeable battery according to a first exemplary embodiment. FIG. 2 is a cross-sectional view of FIG. 1, taken along the line II-II.

Referring to FIG. 1 and FIG. 2, a rechargeable battery according to a first exemplary embodiment may include an electrode assembly 10 that iteratively performs charging and discharging, a case 20 accommodating an electrolyte solution with the electrode assembly 10, a cap plate 30 coupled to an opening 21 of the case 20, and electrode terminals 41 and 42 provided in the cap plate 30.

The rechargeable battery may further include gaskets 51 and 52 sealing the electrode terminals 41 and 42 from the cap plate 30, insulators 61 and 62 insulating the electrode terminals 41 and 42 from the cap plate 30, and sealing members 71 and 72 blocking an ion path between the gaskets 51 and 52 and the insulators 61 and 62. Here, the electrode terminals 41 and 42 and the cap plate 30 are assembled with each other.

For example, the electrode assembly 10 includes electrode plates, i.e., a negative electrode plate 11 and a positive electrode plate 12 disposed at both sides of a separator 13, which is an electric insulator. For example, the electrode assembly 10 may be formed by winding the negative electrode 11, the separator 13, and the positive electrode 12 in a jelly roll state. In another example, the electrode assembly 10 may be assembled by laminating a negative electrode plate and a positive electrode plate, each which is formed by a single plate, with the separator interposed therebetween, or assembled by bending and laminating the negative electrode plate, the separator, and the positive electrode plate in zigzag (not shown).

The negative and positive electrode plates 11 and 12 include coated regions 11a and 12a, e.g., formed by coating an active material on each current collector, and uncoated regions 11b and 12b, e.g., formed by exposing a portion of a current collector that is not coated with the active material at one side of each of the coated regions 11a and 12a. For example, the current collector of the negative electrode plate 11 may be formed of a copper thin film, and the current collector of the positive electrode plate 12 may be formed of an aluminum thin film.

The uncoated region 11b of the negative electrode plate 11 may be formed at one end of the negative electrode plate 11 along the coated region 11a of the wound negative electrode plate 11. The uncoated region 12b of the positive electrode plate 12 is formed at one end of the positive electrode plate 12 along the coated region 12a of the wound positive electrode plate 12. That is, the uncoated regions 11b and 12b are respectively disposed at lateral ends of the electrode assembly 10 for electric connection.

The case 20 may include the opening 21 at one side thereof. Thus, the electrode assembly 10 may be inserted through the opening 21, and may have, e.g., a cuboid shape, forming a receiving space with the electrode assembly 10 for receiving the electrolyte solution.

The cap plate 30 may be coupled with the opening 21 of the case 20. Thus, the cap plate 30 sets a closed receiving space with the case 20. For example, when the case 20 and the cap plate 30 are made of aluminum and coupled with each other by welding, a welding property can be improved because the case 20 and the cap plate 30 are made of the same material.

The cap plate 30 may include an electrolyte injection opening 31 and a vent hole 32. The electrolyte injection opening 31 couples the cap plate 30 to the case 20 to enable the electrolyte solution to be injected into the case 20. After injection of the electrolyte solution, the electrolyte injection opening 31 is sealed by a sealing cap 33.

The vent hole 32 is closed and sealed by a vent plate 34 welded to prevent explosion of the rechargeable battery by emitting internal gas generated due to charging and discharging of the rechargeable battery to the outside. When an internal pressure of the rechargeable battery reaches a predetermined level, the vent plate 34 is ruptured. A notch 34a formed in the vent plate 34 induces a rupture of the vent plate 34. When the vent hole 32 is open due to the rupture of the vent plate 34, the internal gas of the rechargeable battery is emitted.

The cap plate 30 may include terminal holes H1 and H2 for electrical connection of the inside and the outside of the case 20. The electrode terminals, i.e., the negative and positive terminals 41 and 42, may be respectively provided in the terminal holes H1 and H2. The negative and positive terminals 41 and 42 may be connected through respective lead tabs, i.e., negative and positive lead tabs 43 and 44, to the electrode assembly 10. That is, the negative terminal 41 may be connected to the negative electrode plate 11 of the electrode assembly 10 by the negative lead tab 43 having conductivity, and the positive terminal 42 may be connected to the positive electrode plate 12 of the electrode assembly 10 by the positive electrode lead tab 44 having conductivity.

For example, the negative and positive terminals 41 and 42 may include rivet terminals 411 and 421 and plate terminals 412 and 422. The rivet terminals 411 and 421 may be inserted through the terminal holes H1 and H2 of the cap plate 30 to protrude to the inside and outside of the cap plate 30. The plate terminals 412 and 422 may be connected to the outer side ends of the rivet terminals 411 and 421 by riveting. The plate terminals 412 and 422 may be welded to a bus bar (not shown) for serial and parallel connection of other neighboring rechargeable batteries (not shown).

The negative and positive terminals 41 and 42 may be electrically connected to respective negative and positive lead tabs 43 and 44 at the inside of the cap plate 30. That is, the negative and positive electrode lead tabs 43 and 44 caulk lower ends of the rivet terminals 411 and 421 by being fit to the lower ends of the rivet terminals 411 and 421, such that they can be electrically and mechanically connected to the negative and positive terminals 41 and 42. In other words, lower ends of the rivet terminals 411 and 421 inside the case 20 may fit into openings in respective negative and positive electrode lead tabs 43 and 44 to provide mechanical and electrical connections.

Inner insulators, i.e., negative and positive inner insulators 81 and 82, may support respective negative and positive lead tabs 43 and 44 and respective rivet terminals 411 and 421 that are electrically connected with each other in the cap plate 30 with respect to the cap plate 30 in an insulated manner. That is, the negative and positive inner insulators 81 and 82 may be between the cap plate 30 and each respective negative and positive lead tabs 43 and 44.

Gaskets 51 and 52 may be provided between each of the negative and positive terminals 41 and 42 and respective interior circumferences of the terminal holes H1 and H2. That is, the gaskets 51 and 52 may be provided between external circumferences of the rivet terminals 411 and 421 and the interior circumferences of the terminal holes H1 and H2, respectively, for sealing between the rivet terminals 411 and 421 and the terminal holes H1 and H2.

In addition, the insulators 61 and 62 may be provided between the cap plate 30 and each of the negative and positive terminals 41 and 42 at the outside of the gaskets 51 and 52. That is, the insulators 61 and 62 may be respectively provided between an upper surface of the cap plate 30 and bottom surfaces of the plate terminals 412 and 422 for electrical insulation and sealing between the cap plate 30 and each of the plate terminals 412 and 422.

In this state, interior circumferences of through-holes 611 of the insulators 61 and 62 (FIG. 3) and the external circumferences of the gaskets 51 and 52 may face each other, respectively. Sealing members 71 and 72 may be provided between the gaskets 51 and 52 and the insulators 61 and 62, respectively. The sealing members 71 and 72 may continuously extend along at least one surface of the gaskets 51 and 52, respectively, and along at least one surface of the insulators 61 and 62, respectively. The sealing members 71 and 72 according to example embodiments may block an ion exchange path between the gasket 51 and the insulator 61, i.e., an ion exchange path connecting an external circumference of the rivet terminal 411 and an interior circumference of the terminal holes H1, and between the gasket 52 and the insulator 62, i.e., an ion exchange path connecting an external circumference of the rivet terminal 412 and an interior circumference of the terminal holes H2. The sealing members 71 and 72 will be described in more detail below with reference to FIGS. 3-4.

Figure 3:
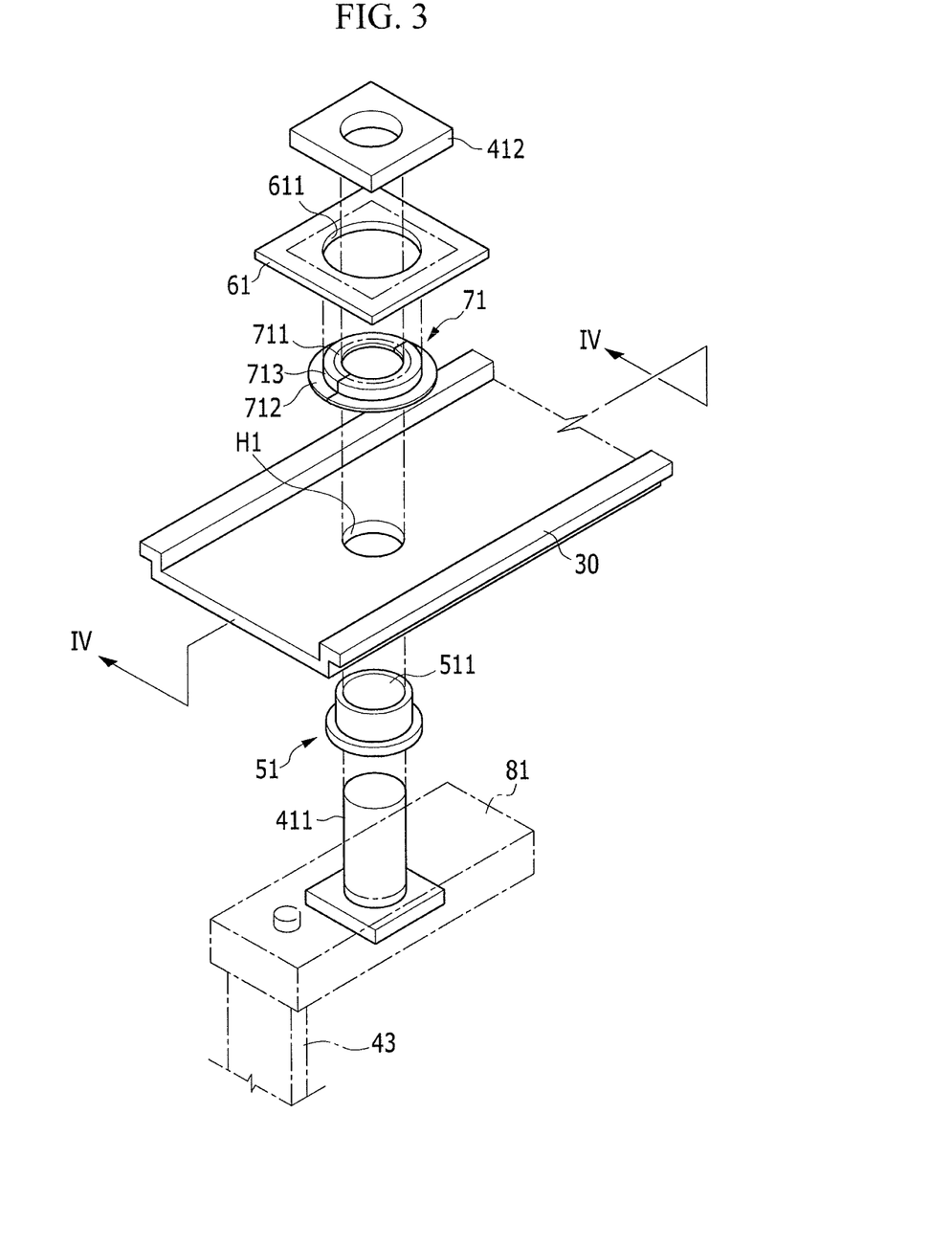
FIG. 3 illustrates an exploded perspective view of an electrode terminal through a cap plate according to the first exemplary embodiment.
Figure 4:
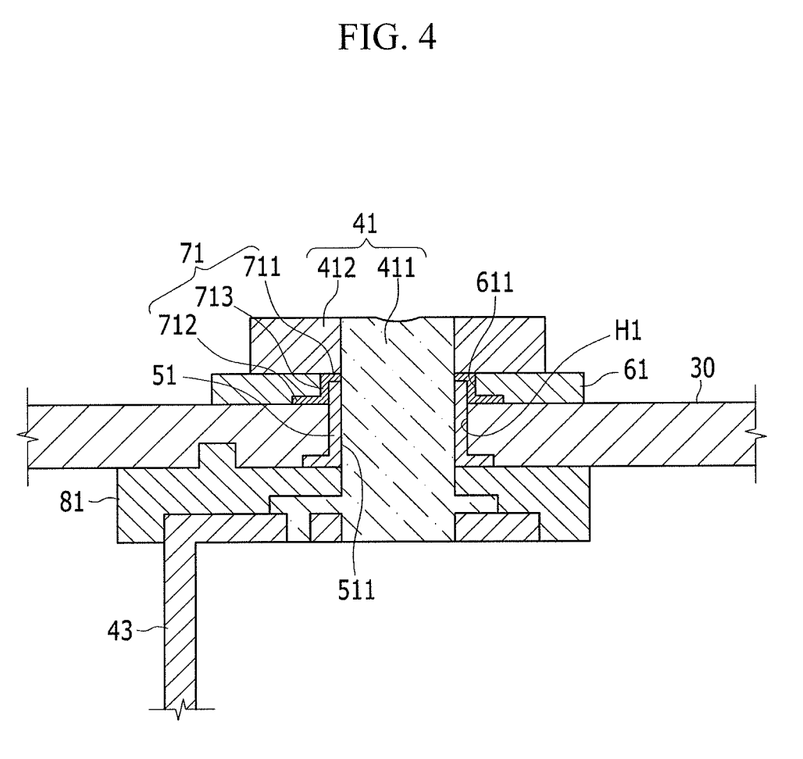
FIG. 4 illustrates a cross-sectional view of FIG. 3 along line III-III.

FIG. 3 is an exploded perspective view of an assembled part of the cap plate 30 and the negative electrode terminal 41, and FIG. 4 is a cross-sectional view of FIG. 3, taken along the line III-III. Since the negative terminal 41 and the positive terminal 42 are respectively assembled to the cap plate 30 with the same structure, only the negative terminal 41 will be described for convenience of description.

Referring to FIG. 3 and FIG. 4, the sealing member 71 may include a cylinder 713 and first and second flanges 711 and 712 formed at lateral ends of the cylinder 713. For example, the cylinder 713 may have a ring structure around the negative terminal 41, e.g., to completely surround the terminal 41. The cylinder 713 may be positioned between the insulator 61 and the gasket 51, i.e., between an interior circumference of the through-hole 611 of the insulator 61 and an exterior circumference 511 of the gasket 51. As such, moisture penetration may be blocked, thereby blocking the ion exchange path form the gasket 51 to the insulator 61. That is, the gasket 51 may be disposed at the inner side of the cylinder 713, and the insulator 61 may be disposed at the outer side of the cylinder 713.

The first flange 711 of the sealing member 71 may be bent to the center of the cylinder 713 from an upper end thereof, and may extend between the gasket 51 and the plate terminal 412 to block the ion path between the upper end of the gasket 51 and the plate terminal 412. For example, the first flange 711 may have a flat ring structure connected to an upper edge of the cylinder 713, such that the flat ring structure extends toward the negative terminal 41, i.e., the first flange 711 may have a smaller inner diameter than the cylinder 713, to separate between. For example, the first flange 711 may be formed flat.

The second flange 712 may be bent to the outside of the cylinder 713, i.e., in an opposite direction as compared to the first flange 711, from a lower end of the cylinder 713 to extend between the insulator 61 and the cap plate 30. Therefore, the second flange 712 may block the ion path between the bottom surface of the insulator 61 and the outer surface of the cap plate 30. For example, the second flange 712 may be formed flat.

That is, the sealing member 71 may be bent between the cylinder 713 and each of the first and second flanges 711 and 712, so the sealing member 71 may overlap at least two different surfaces of each of the insulating member 61 and gasket 51. In other words, the sealing member 71 may have two horizontal portions substantially parallel to each other and connected by one vertical portion, such that the horizontal portions, i.e., the first and second flanges 711 and 712, may be positioned against the plate terminal 412 and the cap plate 30, respectively, and the vertical portion, i.e., the cylinder 713, may be positioned against the gasket 51. As such, the ion path may be further blocked between the gasket 51 and the insulator 61, and rigidity of the sealing structure may be further increased. For example, the sealing member 71 may form a double or triple sealing structure with the gasket 51 and the insulator 61.

In detail, the double-sealing structure may be formed in a shaft direction of the rivet terminal 411, i.e., along a longitudinal direction of the rivet terminal 411, between the plate terminal 412 and the cap plate 30. That is, in the double-sealing structure, two sealing elements may be disposed adjacent to each other and along the shaft direction of the rivet terminal 411 to separate between the plate terminal 412 and the cap plate 30. For example, portions of the sealing member 71 and the gasket 51 may be aligned along the rivet terminal 411 between the cap plate 30, e.g., a lower portion of the gasket 51, and the plate terminal 412. Similarly, portions of the sealing member 71 and the insulator 61 may be arranged along the rivet terminal 411 between the cap plate 30 and the plate terminal 412.

The triple-sealing structure may be formed in a diameter direction of the rivet terminal 411 between the plate terminal 412 and the cap plate 30. That is, in the triple-sealing structure, three sealing elements may be disposed radially adjacent to each other in the diameter direction of the rivet terminal 411, e.g., each element may surrounds the rivet terminal 411 at a different distance, between the plate terminal 412 and the cap plate 30. For example, portions of the gasket 51, the sealing member 71, and the insulator 61 may be formed adjacent to each other along a radial direction with respect to the rivet terminal 411 between the plate terminal 412 and the cap plate 30.

The sealing member 71 may be formed of a polymer-based material. For example, a polymer-based film having a thickness of about 0.1 mm may be inserted between the plate terminal 412 and the cap plate 30, followed by compression to block the ion exchange path by blocking moisture permeation (not shown).

Hereinafter, second to fourth exemplary embodiments will be described. Detailed description of same elements will be omitted, and only differences between embodiments will be described.

Figure 5:
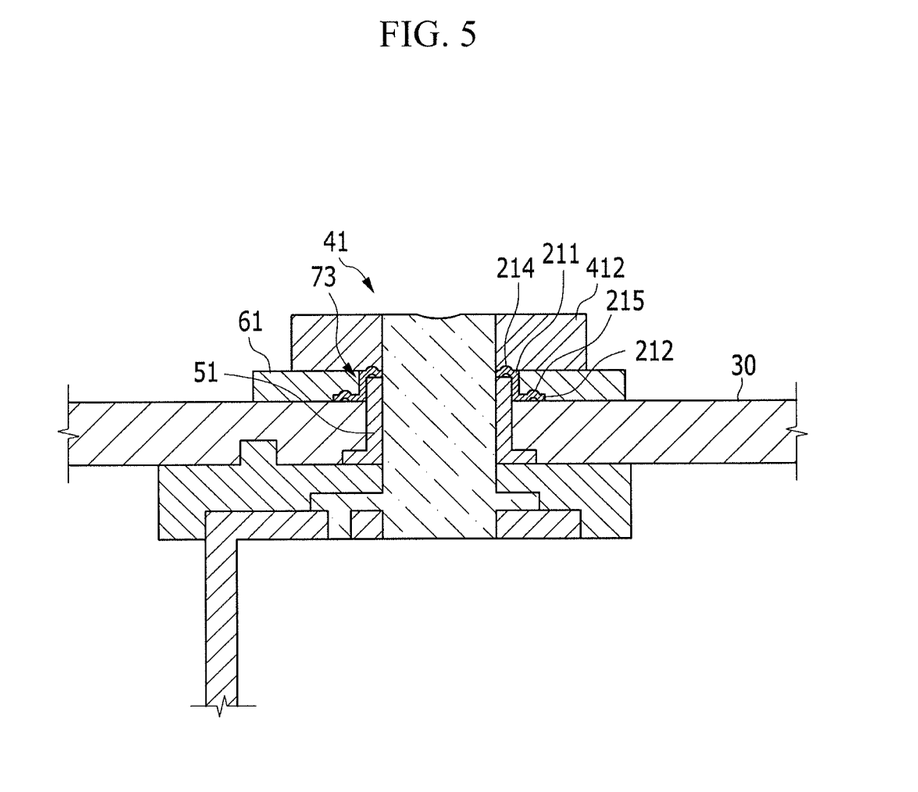
FIG. 5 illustrates a cross-sectional view of an electrode terminal through a cap plate according to a second exemplary embodiment.

FIG. 5 is a cross-sectional view of an assembled part of a cap plate 30 and the negative electrode terminal 41 in a rechargeable battery according to a second exemplary embodiment. Referring to FIG. 5, a sealing member 73 of the negative terminal 41 may include a first flange 211 with a first protrusion 214 protruding toward the plate terminal 412 at an upper end of a gasket 51. Further, the sealing member 73 includes a second flange 212 with a second protrusion 215 protruding toward the insulator 61 from the cap plate 30.

The first protrusion 214 may increase a total length of the first flange 211, such that the ion exchange path may be increased as well between the upper end of the gasket 51 and a bottom surface of the plate terminal 412, i.e., a surface facing the upper end of the gasket 51. As such, the sealing member 73 may form a stronger sealing structure, thereby improving sealing performance.

The second protrusion 215 may increase a total length of the second flange 215, such that the ion exchange path may be increased as well between an outer surface of the cap plate 30 and a bottom surface of the insulator 61, i.e., a surface facing the outer surface of the cap plate 30. As such, the sealing member 73 may form a stronger sealing structure, thereby improving sealing performance.

Figure 6:
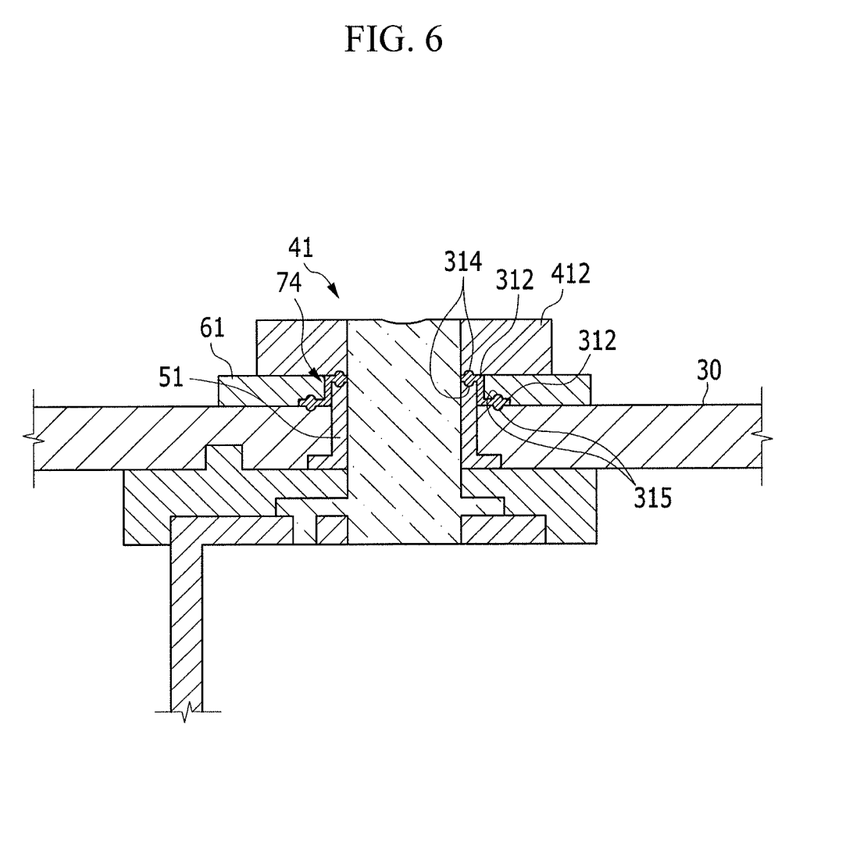
FIG. 6 illustrates a cross-sectional view of an electrode terminal through a cap plate according to a second exemplary embodiment.

FIG. 6 is a cross-sectional view of an assembled part of the cap plate 30 and the negative electrode terminal 41 in a rechargeable battery according to a third exemplary embodiment. Referring to FIG. 6, a sealing member 74 of the negative terminal 41 may include a first flange 311 with a pair of first protrusions 314 protruding in opposite directions, i.e., toward the plate terminal 412 and the upper end of a gasket 51. The sealing member 74 may further include a second flange 312 with a pair of second protrusions 315 protruding in opposite directions, i.e., toward the insulator 61 and the cap plate 30.

The first protrusion 314 extends the ion exchange path further longer between a bottom surface of the plate terminal 412 and the upper end of the gasket 51 facing the bottom surface of the plate terminal 412, and forms a stronger sealing structure so that a sealing performance can be further improved. The second protrusion 315 extends the ion exchange path further longer between a bottom surface of the insulator 61 and an outer surface of the cap plate 30 facing the bottom surface of the insulator 61, and forms a stronger sealing structure so that a sealing performance can be further improved.

Figure 7:
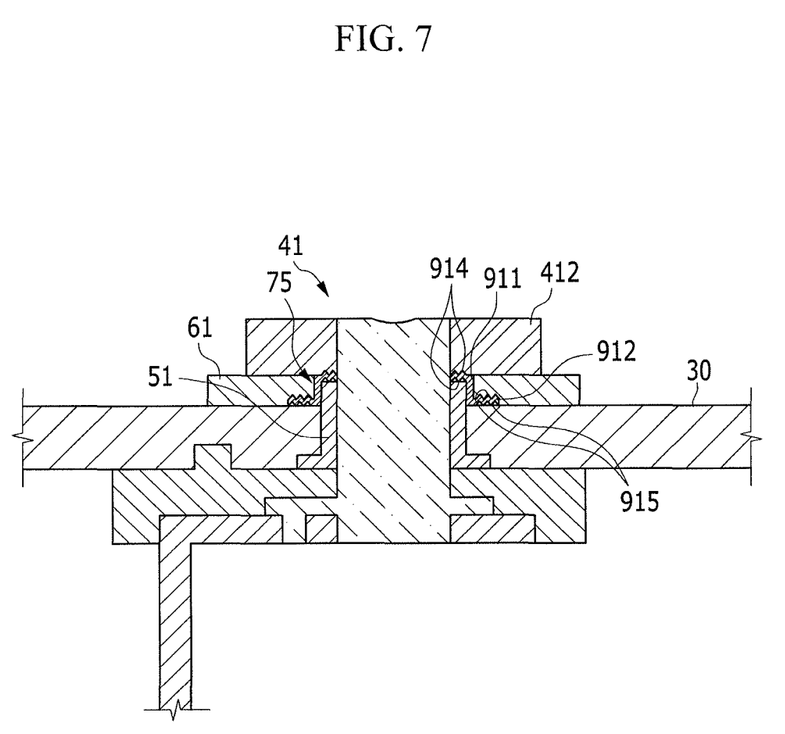
FIG. 7 illustrates a cross-sectional view of an electrode terminal through a cap plate according to a second exemplary embodiment.

FIG. 7 is a cross-sectional view of an assembled part of the cap plate 30 and the negative electrode terminal 41 in a rechargeable battery according to a fourth exemplary embodiment. Referring to FIG. 7, a sealing member 75 of the negative terminal 41 may include a first flange 911 with a first protrusion and depression portion 914 that is concave and convex to both sides toward the plate terminal 412 and the upper end of a gasket 51. The sealing member 75 may further include a second flange 912 with a second protrusion and depression portion 915 that is concave and convex to both sides toward the cap plate 30. For example, each of the first and second protrusion and depression portions 914 and 915 may include at least two protrusions with a depression therebetween, such that the depression and protrusions are directed in opposite directions.

The first protrusion and depression portion 914 may extend the ion exchange path further longer between the bottom surface of the plate terminal 412 and the upper end of the gasket 51 facing the bottom surface of the plate terminal 412, and forms a stronger sealing structure so that a sealing performance can be further improved. The second protrusion and depression portion 915 may extend the ion exchange path further longer between the bottom surface of the insulator 61 and the outer surface of the cap plate 30 facing the bottom surface of the insulator 61, and forms a stronger sealing structure so that a sealing performance can be further improved.

According to the exemplary embodiments, a rechargeable battery may block an ion exchange path in a portion where a cap plate and an electrode terminal are assembled. That is, an ion exchange path formed between the gasket and the insulator may be blocked by the sealing member, so that corrosion of the case and the cap plate due to a chemical reaction can be prevented and a leakage of an electrolyte solution can be prevented.

In contrast, a rechargeable battery without the sealing member may have a path for ion exchange in a portion where the cap plate and the electrode terminal are assembled due to a sealing structure error between a surface of the gasket and a surface of the terminal hole and between a contact side of the gasket and the insulator. When such ion exchange path is formed, the case and the cap plate may be corroded due to a chemical reaction, thereby causing an electrolyte solution leakage.

<Description of symbols>

| | |
|---|---|
| 10: electrode assembly | |
| 11, 12: negative electrode, positive electrode | |
| 11a, 12a: coated region | 11b, 12b: uncoated region |
| 20: case | 21: opening |
| 30: cap plate | 31: electrolyte injection opening |
| 32: vent hole | 33: sealing cap |
| 34: vent plate | 41, 42: negative electrode, positive electrode |
| 43, 44: negative electrode lead tab, positive electrode lead tab | |
| 51, 52: gasket | 61, 62: insulator |
| 71, 72, 73, 74, 75: sealing member | |
| 81, 82: negative electrode inner insulator, positive electrode inner insulator | |
| 211, 311, 711, 911: first flange | |
| 212, 312, 712, 912: second flange | 214, 314: first protrusion |
| 215, 315: second protrusion | 411, 421: rivet terminal |
| 412, 422: plate terminal | 611: through-hole |
| 713: cylinder | |
| 914, 915: first and second protrusions and depressions | |
| H1, H2: terminal hole | |

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly having a separator between electrode plates;
    a case accommodating the electrode assembly;
    a cap plate coupled to an opening of the case, the cap plate having an exterior facing an outside of the rechargeable battery and an interior facing an inside of the rechargeable battery;
    an electrode terminal through a terminal hole in the cap plate, the electrode terminal including a rivet terminal extending through the terminal hole and a plate terminal at the exterior of the cap plate;
    a gasket between an outer circumference of the rivet terminal and an inner circumference of the terminal hole;
    an insulator between the exterior of the cap plate and the plate terminal, a portion of the gasket being between the insulator and the outer circumference of the rivet terminal; and
    a sealing member between the gasket and the insulator, the sealing member extending continuously along a first surface of the gasket and along a first surface of the insulator, the first surface of the gasket and the first surface of the insulator being non-parallel to each other,
    wherein the sealing member includes:
        a cylinder between the interior circumference of the through-hole of the insulator and the exterior circumference of the gasket;
        a first flange bent from an upper end of the cylinder toward a center of the cylinder, the first flange being between the gasket and the plate terminal; and
        a second flange bent from a lower end of the cylinder in an opposite direction with respect to the first flange, the second flange being between the insulator and the cap plate.

2. The rechargeable battery as claimed in claim 1, wherein an inner circumference of a through-hole of the insulator and an outer circumference of the gasket face each other.

3. The rechargeable battery as claimed in claim 1, wherein the first flange and the second flange are flat.

4. The rechargeable battery as claimed in claim 1, wherein the first flange includes a first protrusion protruding toward the plate terminal at an upper end of the cylinder.

5. The rechargeable battery as claimed in claim 1, wherein the second flange includes a second protrusion protruding toward the insulator from the cap plate.

6. The rechargeable battery as claimed in claim 1, wherein the first flange includes a pair of first protrusions protruding toward the plate terminal and an upper end of the gasket.

7. The rechargeable battery as claimed in claim 1, wherein the second flange includes a pair of second protrusions protruding toward the insulator and the cap plate.

8. The rechargeable battery as claimed in claim 1, wherein the first flange includes a first protrusion and depression portion that is concave and convex toward the plate terminal and an upper end of the gasket.

9. The rechargeable battery as claimed in claim 1, wherein the second flange includes a second protrusion and depression portion that is concave and convex toward the insulator and the cap plate.

10. The rechargeable battery as claimed in claim 1, wherein the sealing member extends along and contacts at least two different surfaces of each of the gasket and the insulator.

11. The rechargeable battery as claimed in claim 1, wherein the sealing member directly contacts the gasket, the insulator, the plate terminal, the rivet terminal, and the cap plate.

12. The rechargeable battery as claimed in claim 1, wherein the sealing member and the insulator directly contact each other, the sealing member and the insulator separating the cap plate from the electrode terminal in a first direction.

13. The rechargeable battery as claimed in claim 12, wherein the sealing member and the gasket directly contact each other, portions of the sealing member and the gasket separating the cap plate from the electrode terminal in the first direction.

14. The rechargeable battery as claimed in claim 1, wherein at least two of the sealing member, the gasket, and the insulator are arranged to contact each to define a double-sealing structure, the double-sealing structure including two insulating elements separating the cap plate from the electrode terminal.

15. The rechargeable battery as claimed in claim 1, wherein the sealing member is external to the cap plate.

16. The rechargeable battery as claimed in claim 1, wherein the sealing member is between the insulator and the outer circumference of the rivet terminal.

17. A rechargeable battery, comprising:
    an electrode assembly having a separator between electrode plates;
    a case accommodating the electrode assembly;
    a cap plate coupled to an opening of the case; and
    an electrode terminal extending through a terminal hole in the cap plate, the electrode terminal including a rivet terminal and a plate terminal connected to the rivet terminal, the rivet terminal and the plate terminal being outside the cap plate,
    a gasket between the rivet terminal and the terminal hole;
    an insulator disposed between the cap plate and the plate terminal; and
    a sealing member contacting the gasket and the insulator to define a double-sealing structure along the rivet terminal between the plate terminal and the cap plate and a triple-sealing structure in a diameter direction of the rivet terminal,
    wherein the sealing member includes:
        a cylinder between the interior circumference of the through-hole of the insulator and the exterior circumference of the gasket;
        a first flange bent from an upper end of the cylinder toward a center of the cylinder, the first flange being between the gasket and the plate terminal; and
        a second flange bent from a lower end of the cylinder in an opposite direction with respect to the first flange, the second flange being between the insulator and the cap plate.

18. The rechargeable battery as claimed in claim 17, wherein:
    the double-sealing structure includes at least portions of the sealing member and the gasket between the cap plate and the plate terminal, and at least portions of the sealing member and the insulator between the cap plate and the plate terminal; and the triple-sealing structure includes the sealing member, the insulator, and the gasket between the cap plate and the plate terminal.

19. The rechargeable battery as claimed in claim 17, wherein the sealing member is external to the cap plate.

20. The rechargeable battery as claimed in claim 17, wherein the sealing member is between the insulator and the outer circumference of the rivet terminal.

* * * * *